(12) United States Patent
Yokota et al.

(10) Patent No.: US 9,939,024 B2
(45) Date of Patent: Apr. 10, 2018

(54) METHOD OF MANUFACTURING WHEEL BEARING APPARATUS, AND WHEEL BEARING APPARATUS

(71) Applicant: JTEKT CORPORATION, Osaka-shi, Osaka (JP)

(72) Inventors: Tatsuya Yokota, Tsu (JP); Nobuyuki Seo, Toyoake (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/412,718

(22) Filed: Jan. 23, 2017

(65) Prior Publication Data

US 2017/0219013 A1    Aug. 3, 2017

(30) Foreign Application Priority Data

Jan. 28, 2016 (JP) .................. 2016-014058

(51) Int. Cl.
*F16C 19/18* (2006.01)
*F16C 43/04* (2006.01)
*B60B 27/00* (2006.01)

(52) U.S. Cl.
CPC .......... *F16C 43/04* (2013.01); *B60B 27/0005* (2013.01); *B60B 27/0026* (2013.01); *B60B 27/0078* (2013.01); *F16C 19/186* (2013.01); *B60B 2310/314* (2013.01); *B60B 2310/616* (2013.01); *B60B 2380/12* (2013.01); *B60B 2900/141* (2013.01); *B60B 2900/572* (2013.01); *F16C 2220/40* (2013.01); *F16C 2220/62* (2013.01); *F16C 2223/30* (2013.01); *F16C 2226/52* (2013.01); *F16C 2326/02* (2013.01)

(58) Field of Classification Search
CPC ................ F16C 19/186; F16C 2223/30; F16C 2223/40; F16C 2223/42; F16C 2223/44; F16C 2223/60; F16C 2223/70; F16C 2326/02; F16C 43/04
See application file for complete search history.

(56) References Cited

U.S. PATENT DOCUMENTS

| 2009/0129715 A1* | 5/2009 | Fukumura | B60B 27/00 384/537 |
| 2010/0074568 A1* | 3/2010 | Uchiyama | B60B 7/00 384/480 |

FOREIGN PATENT DOCUMENTS

JP        2005-239115 A        9/2005

* cited by examiner

*Primary Examiner* — Phillip A Johnson
(74) *Attorney, Agent, or Firm* — Oliff PLC

(57) ABSTRACT

Provided is a method of manufacturing a wheel bearing apparatus including an outer ring, a rolling element, a hub spindle, and an inner ring member. The hub spindle is disposed inward of the outer ring in a radial direction via the rolling element. The inner ring member fitted on the hub spindle and is secured by a clinched portion. The clinched portion is formed by clinching a spindle end portion of the hub spindle outward in the radial direction. The method includes: plating a predetermined area including the spindle end portion of the hub spindle; removing a plating of the spindle end portion of the predetermined area; and clinching the spindle end portion to form the clinched portion after removing the plating.

4 Claims, 4 Drawing Sheets

METHOD OF MANUFACTURING WHEEL BEARING APPARATUS, AND WHEEL BEARING APPARATUS

INCORPORATION BY REFERENCE

The disclosure of Japanese Patent Application No. 2016-014058 filed on Jan. 28, 2016 including the specification, drawings and abstract, is incorporated herein by reference in its entirety.

BACKGROUND OF THE INVENTION

1. Field of the Invention

The present invention relates to a method of manufacturing a wheel bearing apparatus, and a wheel bearing apparatus.

2. Description of the Related Art

A vehicle, such as an automobile, is provided with a wheel bearing apparatus used to install a wheel so as to rotate with respect to the body of the vehicle. This wheel bearing apparatus includes a hub wheel, an inner ring member, an outer ring, and a plurality of rolling elements (for example, see Japanese Patent Application Publication No. 2005-239115 (JP 2005-239115 A)). The hub wheel has a hub spindle. The inner ring member is fixed to a spindle end portion of the hub spindle. The outer ring is disposed outward of the hub spindle in a radial direction. The rolling elements are provided between an inner ring raceway formed on an outer periphery of the hub spindle and/or the inner ring member, and an outer ring raceway formed on an inner periphery of the outer ring so that the rolling elements can roll.

Each surface of the outer ring and the hub spindle of such a wheel bearing apparatus can be coated with, for example, nickel plating or zinc plating to improve corrosion resistance and quality of appearance. In the hub spindle coated with the plating, the inner ring member is fitted on a small-diameter portion formed in an outer periphery of the hub spindle. The inner ring member is secured to the hub spindle by clinching a spindle end portion of the small-diameter portion outward in the radial direction using a clinching punch.

In a wheel bearing apparatus for a driving wheel, the hub spindle of the hub wheel is formed like a cylindrical shaft, and thus a shaft of a constant-velocity joint is inserted through the hub spindle along a plated inner periphery of the hub spindle. The inner periphery of the hub spindle is provided with a female spline. A male spline formed on an outer periphery of the shaft fits in the female spline, and thus the shaft and the hub spindle are coupled to each other so that power can be transferred in a rotational direction.

Since the plating is applied to the hub spindle of the above-described wheel bearing apparatus and then the spindle end portion is clinched, the plating can be peeled from a contact surface of the hub spindle that a clinching punch contacts. In this case, the peeled plating is caught between the clinching punch and a clinched portion of the hub spindle, producing indentations and scratches on a surface of the clinched portion and reducing quality. Furthermore, scratches are also produced on a surface of the clinching punch, shortening a life of the clinching punch.

The shaft of the constant-velocity joint is spline-fitted in the plated inner periphery of the hub spindle. Thus, the contact of the shaft to the inner periphery of the hub spindle causes peeling of the plating of the inner periphery of the hub spindle. This loosens the fit between the hub spindle and the shaft.

SUMMARY OF THE INVENTION

An object of the present invention is to provide a method of manufacturing a wheel bearing apparatus, and a wheel bearing apparatus. By this method and apparatus, corrosion resistance and quality of appearance of a hub spindle can be improved while preventing reduction in quality of clinched portion of the hub spindle.

An aspect of the present invention relates to a method of manufacturing a wheel bearing apparatus including an outer ring, a rolling element, a hub spindle, and an inner ring member. The hub spindle is disposed inward of the outer ring in a radial direction via the rolling element. The inner ring member is fitted on the hub spindle and secured by a clinched portion. The clinched portion is formed by clinching a spindle end portion of the hub spindle outward in the radial direction. The method includes: plating a predetermined area including the spindle end portion of the hub spindle; removing a plating of at least a portion of the spindle end portion in the predetermined area; and clinching the spindle end portion to form the clinched portion after removing the plating.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
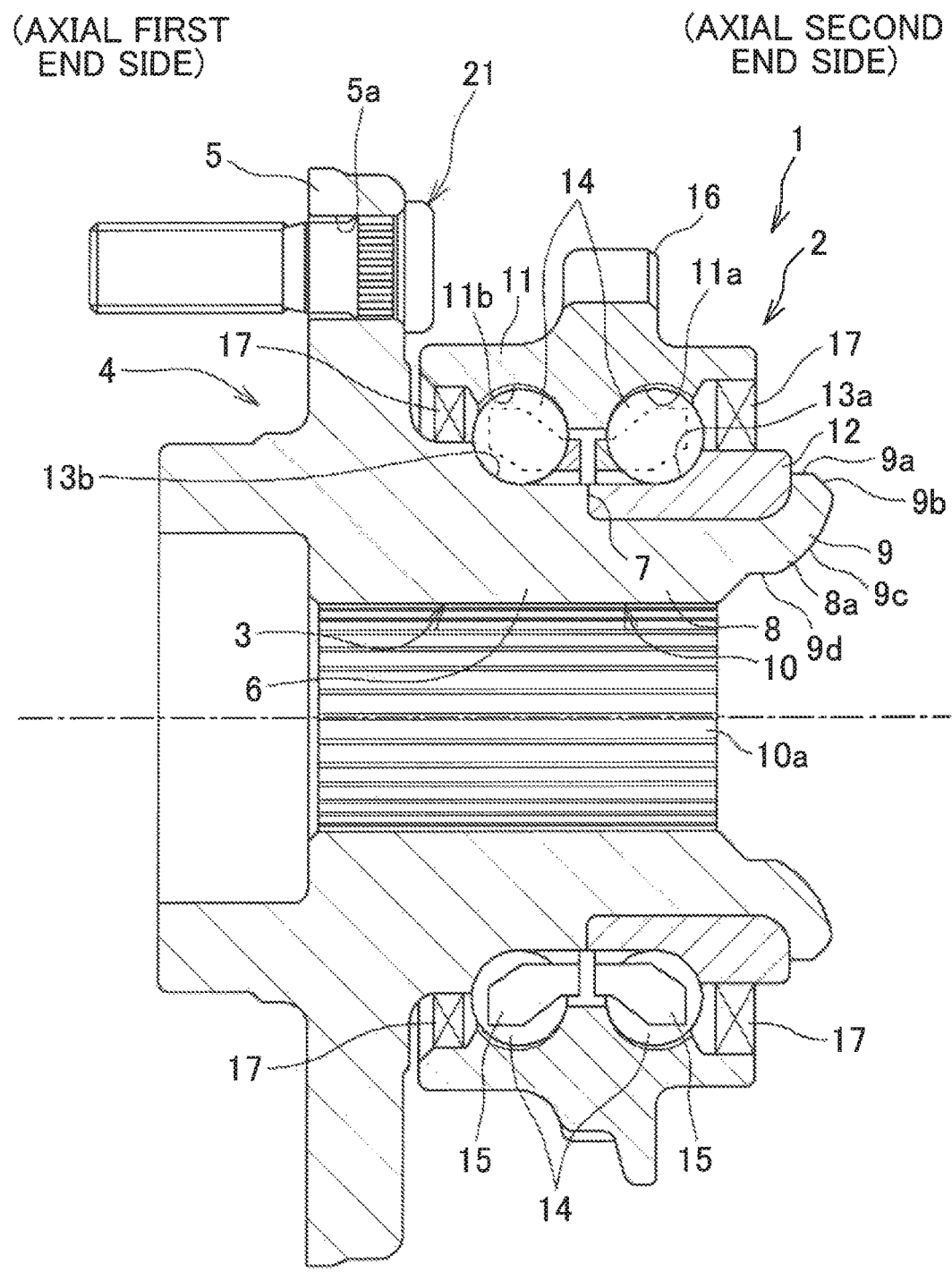
FIG. 1 is a sectional view showing a wheel bearing apparatus of one embodiment of the present invention.

Hereinafter, embodiments of the present invention will be described in detail with reference to the accompanying drawings. FIG. 1 is a sectional view showing a wheel bearing apparatus 1 of one embodiment of the present invention. The wheel bearing apparatus 1 supports a wheel of, for example, an automobile so that the wheel can rotate with respect to a suspension system of the body of the vehicle. FIG. 1 shows the wheel bearing apparatus 1 for a driving wheel of an automobile.

The wheel bearing apparatus 1 includes a rolling bearing 2 and a hub wheel 4. The hub wheel 4 has a cylindrical hub spindle 3 that serves as a raceway ring member for the rolling bearing 2. The hub spindle 3 of the hub wheel 4 has a large-diameter portion 6 and a small-diameter portion 8. The large-diameter portion 6 is formed on an axial first end side. The small-diameter portion 8 has a diameter smaller than that of the large-diameter portion 6, and is formed continuously to the large-diameter portion 6 via a step surface 7 and extending from the large-diameter portion 6 toward an axial second end side.

The rolling bearing 2 is, for example, a double row ball bearing and includes an outer ring 11 and an inner ring member 12. The outer ring 11 has a pair of outer ring raceway surfaces 11a, 11b on an inner periphery of the outer ring 11. An inner periphery of the inner ring member 12 is fitted on the small-diameter portion 8 of the hub spindle 3. A spindle end portion 8a of the small-diameter portion 8, which is on the axial second end side, is clinched outward in the radial direction by using a clinching punch (not shown), and thus a clinched portion 9 is formed. The inner ring member 12 is fitted and fixed on the small-diameter portion 8.

The outer surface of the clinched portion 9 has a first flat surface 9a, a tapered surface 9b, a curved surface 9c, and a second flat surface 9d that are formed continuously in this order, as viewed in the cross-sectional view. The inner ring member 12 has an inner ring raceway surface 13a on an outer periphery of the inner ring member 12. The inner ring raceway surface 13a faces the outer ring raceway surface 11a that is on the axial second end side. The large-diameter portion 6 of the hub spindle 3 has a spindle raceway surface 13b on an outer periphery of the large-diameter portion 6. The spindle raceway surface 13b faces the outer ring raceway surface 11b that is on the axial first end side.

The rolling bearing 2 includes a plurality of balls (rolling elements) 14 that can roll and that are disposed in two rows between the outer ring raceway surface 11a and the inner ring raceway surface 13a and between the outer ring raceway surface 11b and the spindle raceway surface 13b. Thus, the hub spindle 3 is disposed inward of the outer ring 11 in the radial direction via the balls 14. The rolling bearing 2 further includes a pair of cages 15 that holds the balls 14 disposed in two rows, at predetermined intervals in a circumferential direction.

The outer ring 11 is provided, on its outer periphery, with a fixing flange 16 used to secure the wheel bearing apparatus 1 on a member (not shown) of the vehicle body. The member is supported by the suspension system. An annular space between the outer ring 11 and the hub wheel 4 is provided with sealing members 17 used to seal the annular space at both ends thereof in the axial direction.

On the axial first end side of the hub spindle 3, an annular flange portion 5 is formed integrally with the hub spindle 3, and extends outward in the radial direction from an outer periphery of the hub spindle 3. The flange portion 5 is provided with a plurality of bolt holes 5a arranged in the circumferential direction and passing through the flange portion 5 in a thickness direction of the flange portion 5. A hub bolt 21 for attaching a wheel and a brake disc (not shown) is press-fitted in each of the bolt holes 5a and secured thereto.

The hub spindle 3 is provided with an insertion hole 10 which a shaft of a constant-velocity joint (not shown) is inserted through and fitted in. The insertion hole 10 is provided, in its circumferential surface, with a female spline 10a. A male spline (not shown) formed on the outer periphery of the shaft fits in the female spline 10a. With this, the hub spindle 3 and the shaft are coupled to each other so that power can be transferred in the rotational direction.

Figure 2:
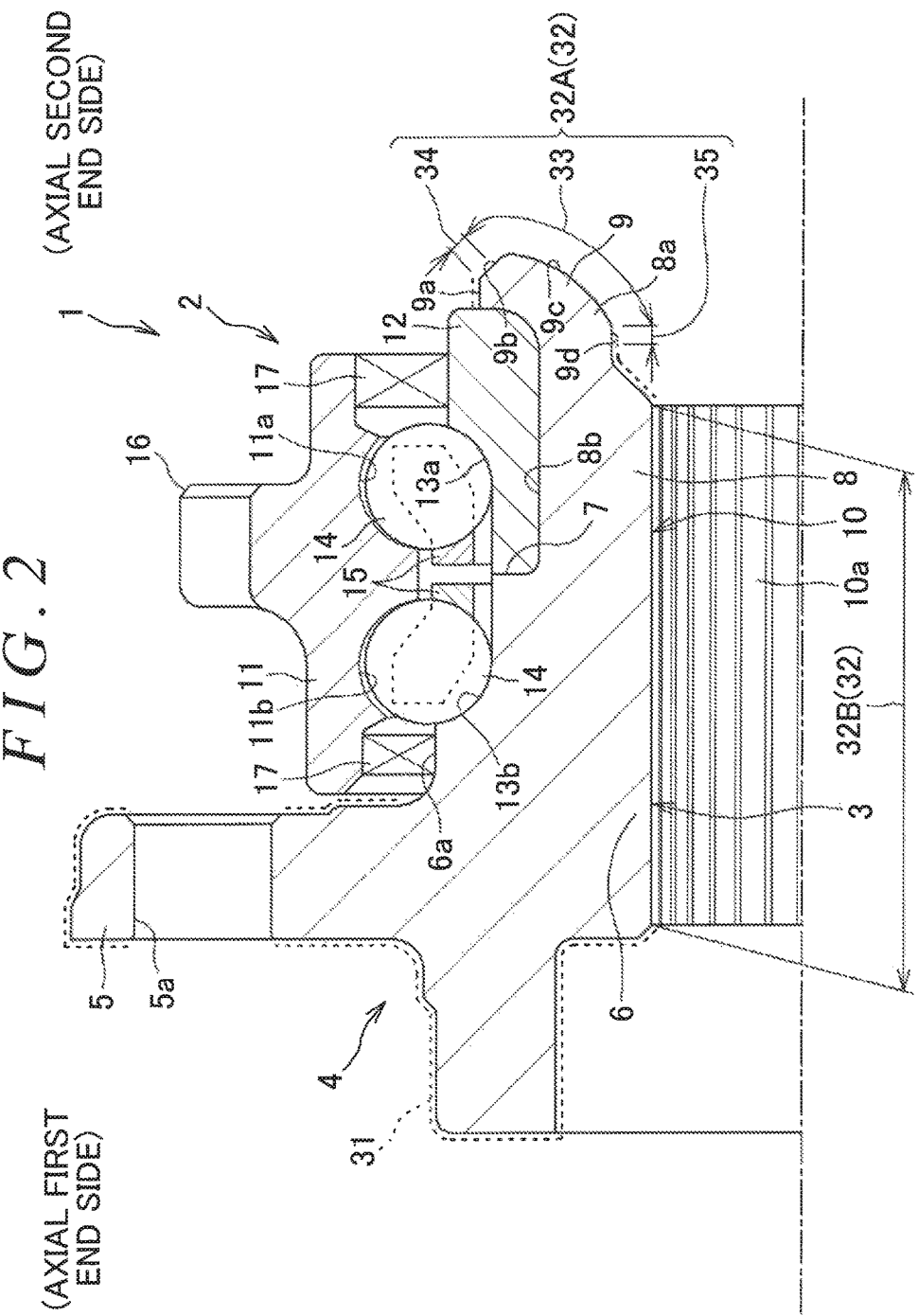
FIG. 2 is an enlarged sectional view showing a portion of the wheel bearing apparatus.

FIG. 2 is an enlarged sectional view showing a portion of the wheel bearing apparatus 1. A predetermined area of the surface of the hub spindle 3 is coated with a plating, such as nickel plating or zinc plating, to improve corrosion resistance and quality of appearance. In the present embodiment, the predetermined area is an area of the surface of the hub spindle 3 other than the bolt hole 5a, the spindle raceway surface 13b, the step surface 7, and the outer periphery of the small-diameter portion 8. In the predetermined area, a plated portion 31 (accompanied by a dashed line in FIG. 2) and a non-plated portion 32 are formed. The non-plated portion 32 is formed by removing the plating of a portion of the predetermined area. The plated portion 31 is the remaining portion of the predetermined area.

The non-plated portion 32 of the present embodiment has a first non-plated portion 32A and a second non-plated portion 32B. The first non-plated portion 32A is formed on an outer surface of the clinched portion 9. The second non-plated portion 32B is formed on a circumferential surface (including the female spline 10a) of the insertion hole 10. The first non-plated portion 32A is formed on a contact area 33 in which the clinching punch contacts the spindle end portion 8a in a clinching process, and on peripheral areas 34, 35 of the contact area 33.

The contact area 33 of the first non-plated portion 32A of the present embodiment is an area having a radially inner portion of the tapered surface 9b of the clinched portion 9 and the whole curved surface 9c. The peripheral area 34 is an area having a radially outer portion of the tapered surface 9b of the clinched portion 9. The peripheral area 35 is an area having an axial second end side portion of the second flat surface 9d of the clinched portion 9. Thus, in the present embodiment, an area having the whole first flat surface 9a and an axial first end side portion of the second flat surface 9d of the clinched portion 9 corresponds to a portion of the plated portion 31. In the present embodiment, a surface of the outer ring 11 (other than the outer ring raceway surfaces 11a, 11b) is also coated with a plating such as nickel plating or zinc plating, as is the hub spindle 3.

Figure 3:
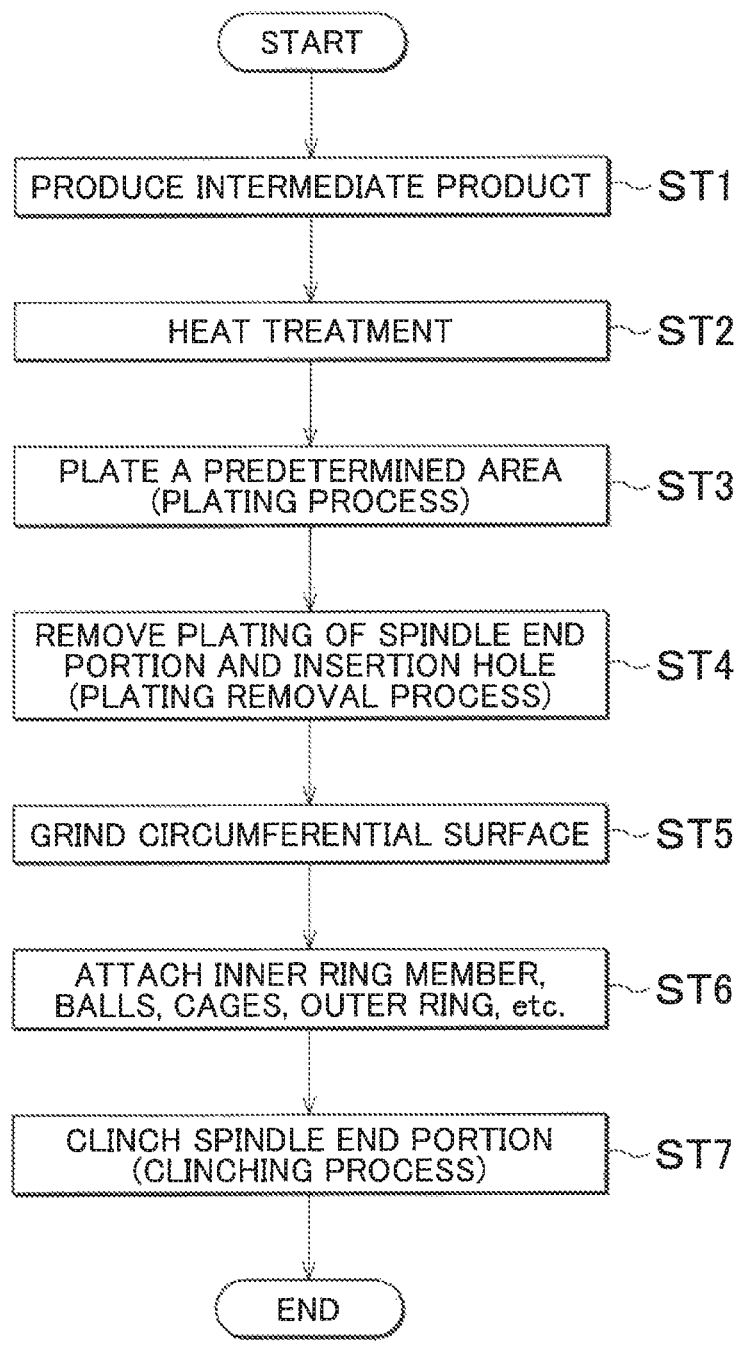
FIG. 3 is a flowchart showing a method of manufacturing the wheel bearing apparatus.
Figure 4:
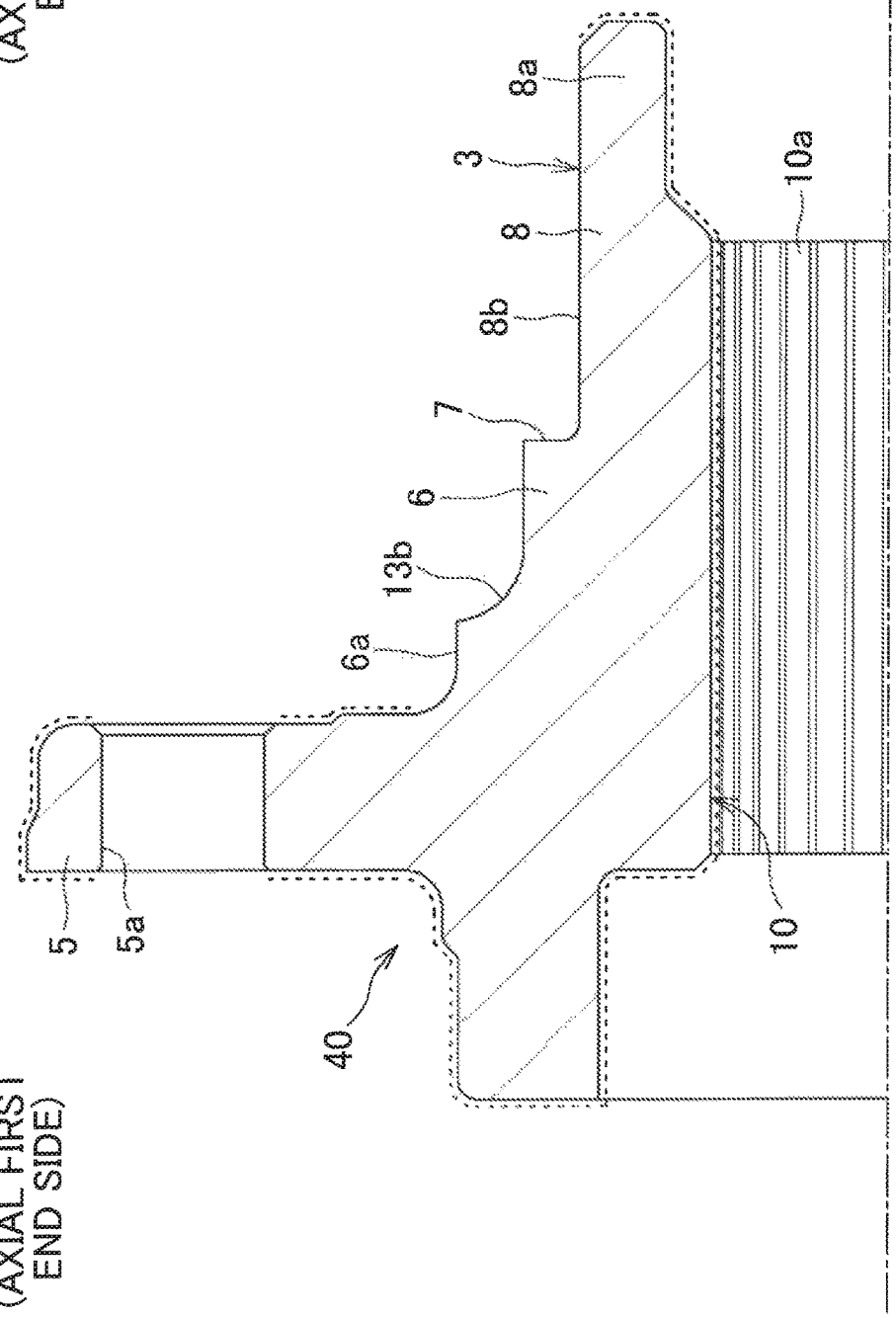
FIG. 4 is a sectional view showing a hub wheel of the wheel bearing apparatus in a state in which the hub wheel is on the way of manufacturing.

FIG. 3 is a flowchart showing a method of manufacturing the wheel bearing apparatus 1. FIG. 4 is a sectional view showing the hub wheel 4 in a state in which the hub wheel 4 is on the way of manufacturing. Hereinafter, with reference to FIGS. 3 and 4, the method of manufacturing the wheel bearing apparatus 1 will be described. First, a material is cut to form an intermediate product 40 for the hub wheel 4 (Step ST1). In this intermediate product 40, the spindle end portion 8a of the small-diameter portion 8 of the hub spindle 3 extends straight toward the axial second end side.

Then, heat treatment such as induction hardening is applied to the surface of the intermediate product 40, and thus a hardened layer is formed on the surface (Step ST2). The predetermined area (accompanied by a dashed line in FIG. 4) is then coated with the plating (Step ST3, plating process). The predetermined area includes an end surface and an inner periphery of the spindle end portion 8a, the circumferential surface (including the female spline 10a) of the insertion hole 10, and the surface of the flange portion 5 (other than the bolt hole 5a). At that time, the non-plated portion 32 is masked.

Of the predetermined area, the end surface and the inner periphery of the spindle end portion 8a and the whole circumferential surface of the insertion hole 10 are subjected to turning so that the plating thereof is machined and removed (Step ST4, plating removal process). In the present embodiment, an area of the end surface and the inner periphery of the spindle end portion 8a, in which the plating is removed, corresponds to the contact area 33 in which the clinching punch contacts the spindle end portion 8a, and to the peripheral areas 34, 35 of the contact area 33 (see FIG. 2). Thus, the plated portion 31 where the hub spindle 3 is coated with plating and the non-plated portion 32 where the hub spindle 3 is not coated with plating are formed as shown in FIG. 2.

In the plating removal process, the plating of at least one of the peripheral areas 34 and 35 needs to be removed. The plating of only the contact area 33 may be removed. In this case, the plating of at least a portion of the contact area 33 needs to be removed.

Then, of the outer periphery of the hub spindle 3, the spindle raceway surface 13b, a contact surface 6a that the sealing member 17 contacts, and a fitting surface 8b into which the inner ring member 12 is press-fitted are ground (Step ST5). As shown in FIG. 2, the inner ring member 12 is fitted on the small-diameter portion 8, and the balls 14, the cages 15, the outer ring 11 and the like are attached to the hub spindle 3 (Step ST6).

Then, the spindle end portion 8a of the small-diameter portion 8 is clinched outward in the radial direction by using the clinching punch, and thus the clinched portion 9 (see FIG. 2) is formed (Step ST7, clinching process). At that time, the clinching punch contacts only the contact area 33 (see FIG. 2) of the spindle end portion 8a. Thus, the inner ring member 12 is fitted and fixed on the small-diameter portion 8 as shown in FIG. 2.

From the above, in the wheel bearing apparatus 1 and the method of manufacturing the same according to the embodiment of the present invention, the predetermined area including the spindle end portion 8a of the hub spindle 3 is coated with the plating, the plating of a portion of the spindle end portion 8a is removed, and then the spindle end portion 8a is clinched to form the clinched portion 9. This can prevent the plating peeled from the spindle end portion 8a from being caught between the clinched portion 9 of the hub spindle 3 and the clinching punch. As a result, indentations and scratches on the clinched portion 9 of the hub spindle 3 can be prevented from occurring due to the peeled plating. Thus, the reduction in quality of the clinched portion 9 can be prevented. The hub spindle 3 has the plated portion 31 coated with the plating, except for a portion of the spindle end portion 8a and the insertion hole 10. This can improve corrosion resistance and quality of appearance of the hub spindle 3.

In the plating removal process, the plating of the contact area 33 of the spindle end portion 8a of the hub spindle 3, which contact area 33 contacts the clinching punch, is removed. This can further effectively prevent the plating from being peeled from the spindle end portion 8a of the hub spindle 3, in the clinching process.

In the wheel bearing apparatus 1 for a driving wheel, the non-plated portion 32B is formed on the circumferential surface of the insertion hole 10 of the hub spindle 3. With this, when the shaft of the constant-velocity joint is inserted through and fitted in the insertion hole 10, no plating is peeled from the circumferential surface of the insertion hole 10. This can prevent looseness of the fit between the hub spindle 3 and the shaft.

The present invention can be embodied, modified as appropriate without limiting to the above-described embodiment. For example, the wheel bearing apparatus of the above-described embodiment has a structure of the third generation in which the spindle raceway surface 13b is directly formed, as an inner ring raceway surface, in the outer periphery of the hub spindle 3. The wheel bearing apparatus, however, may have a structure of the second generation in which a pair of inner ring members 12 is press-fitted in the hub spindle 3. Although the rolling bearing 2 includes the balls 14 as rolling elements, it may include tapered rollers or the like.

Although the wheel bearing apparatus of the above-described embodiment is used for a driving wheel, it may be used for a driven wheel. In this case, since the insertion hole is not formed through the hub spindle, the non-plated portion 32 has only the first non-plated portion 32A of the spindle end portion 8a.

According to the present invention, corrosion resistance and quality of appearance of the hub spindle can be improved while reduction in quality of the clinched portion of the hub spindle can be prevented.

What is claimed is:

1. A method of manufacturing a wheel bearing apparatus including an outer ring, a rolling element, a hub spindle, and an inner ring member, the hub spindle being disposed inward of the outer ring in a radial direction via the rolling element, the inner ring member being fitted on the hub spindle and secured by a clinched portion, the clinched portion being formed by clinching a spindle end portion of the hub spindle outward in the radial direction,
the method comprising:
plating a predetermined area including the spindle end portion of the hub spindle;
removing a plating of at least a portion of the spindle end portion in the predetermined area; and
clinching the spindle end portion to form the clinched portion after removing the plating.

2. The method according to claim 1, wherein the portion of the spindle end portion from which the plating is removed during removing the plating includes a contact area in which a clinching punch to clinch the spindle end portion contacts the spindle end portion.

3. A wheel bearing apparatus comprising:
an outer ring;
a rolling element;
a hub spindle; and
an inner ring member, the hub spindle being disposed inward of the outer ring in a radial direction via the rolling element, the inner ring member being fitted on the hub spindle and secured by a clinched portion, the clinched portion being formed by clinching a spindle end portion of the hub spindle outward in the radial direction, wherein
the hub spindle has a plated portion and a non-plated portion; and
the non-plated portion is formed in a contact area in which a clinching punch to clinch the spindle end portion contacts the spindle end portion, and in a peripheral area of the contact area.

4. The wheel bearing apparatus according to claim 3, wherein
the hub spindle is provided with an insertion hole in which a shaft of a constant-velocity joint is inserted and fitted; and
the non-plated portion is formed in a circumferential surface of the insertion hole.

* * * * *